(12) United States Patent
Lee et al.

(10) Patent No.: US 12,300,821 B2
(45) Date of Patent: May 13, 2025

(54) ANODE BINDER FOR LITHIUM RECHARGEABLE BATTERY, ANODE BINDER INCLUDING CURED COMPOUND OF THE SAME ANODE BINDER

(71) Applicant: LG Chem, Ltd., Seoul (KR)

(72) Inventors: Sungjin Lee, Daejeon (KR); Jeong Man Son, Daejeon (KR); Dong Jo Ryu, Daejeon (KR); Seon Hee Han, Daejeon (KR); Jung Sup Han, Daejeon (KR); Min Ah Kang, Daejeon (KR); Jungeun Woo, Daejeon (KR); Cheolhoon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 807 days.

(21) Appl. No.: 17/299,613

(22) PCT Filed: Oct. 14, 2020

(86) PCT No.: PCT/KR2020/013964
§ 371 (c)(1),
(2) Date: Jun. 3, 2021

(87) PCT Pub. No.: WO2021/085894
PCT Pub. Date: May 6, 2021

(65) Prior Publication Data
US 2022/0020992 A1    Jan. 20, 2022

(30) Foreign Application Priority Data

Oct. 31, 2019 (KR) .................. 10-2019-0138185
Oct. 13, 2020 (KR) .................. 10-2020-0131978

(51) Int. Cl.
| | |
|---|---|
| *H01M 4/62* | (2006.01) |
| *C08F 236/10* | (2006.01) |
| *C08K 13/02* | (2006.01) |
| *C09D 147/00* | (2006.01) |
| *C08K 3/22* | (2006.01) |
| *C08K 5/42* | (2006.01) |
| *C08K 5/46* | (2006.01) |
| *C08K 5/56* | (2006.01) |
| *H01M 4/02* | (2006.01) |
| *H01M 10/0525* | (2010.01) |

(52) U.S. Cl.
CPC .......... *H01M 4/622* (2013.01); *C08F 236/10* (2013.01); *C08K 13/02* (2013.01); *C09D 147/00* (2013.01); *C08K 2003/2296* (2013.01); *C08K 5/42* (2013.01); *C08K 5/46* (2013.01); *C08K 5/56* (2013.01); *H01M 2004/027* (2013.01); *H01M 10/0525* (2013.01)

(58) Field of Classification Search
CPC .................................................... H01M 4/622
See application file for complete search history.

(56) References Cited

U.S. PATENT DOCUMENTS

| | | | |
|---|---|---|---|
| 2015/0086875 A1* | 3/2015 | Yoshida ................ | H01M 4/139 |
| | | | 429/304 |
| 2018/0030213 A1* | 2/2018 | Johnson ............... | C08G 83/008 |
| 2018/0047974 A1* | 2/2018 | Jo ......................... | H01M 4/366 |
| 2019/0207220 A1 | 7/2019 | Cho et al. | |
| 2020/0176810 A1* | 6/2020 | Ogata ............... | H01M 10/0585 |
| 2020/0259168 A1 | 8/2020 | Cho et al. | |
| 2020/0287216 A1* | 9/2020 | Jang ...................... | H01M 4/386 |

FOREIGN PATENT DOCUMENTS

| | | |
|---|---|---|
| CN | 101560366 A | 10/2009 |
| CN | 104393300 A | 3/2015 |
| CN | 104910447 A | 9/2015 |
| CN | 108456331 A | 8/2018 |
| CN | 109461873 A | 3/2019 |
| CN | 110100344 A | 8/2019 |
| EP | 3667778 A2 | 6/2020 |
| JP | H11097024 A | 4/1999 |
| JP | 2011076902 A | 4/2011 |
| JP | 2017174804 A | 9/2017 |
| KR | 20040033678 A | 4/2004 |
| KR | 20040036459 A | 4/2004 |
| KR | 20170126404 A | 11/2017 |
| KR | 101817006 B1 | 1/2018 |
| KR | 20180033677 A | 4/2018 |
| KR | 20180048554 A | 5/2018 |
| KR | 20190036700 A | 4/2019 |
| KR | 20190118278 A | 10/2019 |
| WO | 2012026462 A1 | 3/2012 |
| WO | 2013146916 A1 | 10/2013 |

OTHER PUBLICATIONS

Li et al., Journal of Power Sources 160 (2006) 542-547.*
(Continued)

*Primary Examiner* — Olatunji A Godo
(74) *Attorney, Agent, or Firm* — Lerner David LLP

(57) ABSTRACT

There is provided an anode binder materials that can be converted into an anode binder having heat resistance, chemical resistance, excellent binding force and durability, and the like, as prerequisites for improving the performances of lithium rechargeable batteries, wherein the anode binder material comprises a vulcanization accelerator comprising a metal-organic framework (MOF); a styrene-butadiene-based copolymer; and sulfur molecule ($S_8$).

17 Claims, No Drawings

(56) References Cited

OTHER PUBLICATIONS

Li et al. (J. Am. Chem. Soc. 1998, 120, 8571-8572).*
International Search Report for Application No. PCT/KR2020/013964, mailing Feb. 2, 2021, 2 pages.
Liu, W. et al., "Enhanced Cycle Life of Si Anode for Li-Ion Batteries by Using Modified Elastomeric Binder", Electrochemical and Solid-State Letters, Dec. 2004, pp. A100-A103, vol. 8, No. 2, XP055885989. Retrieved from the Internet: URL: https://iopscience.iop.org/article/10.1149/1.1847685/pdf>.
Extended European Search Report for Application No. 20880581.2 dated Feb. 10, 2022, pp. 1-7.

\* cited by examiner

ANODE BINDER FOR LITHIUM RECHARGEABLE BATTERY, ANODE BINDER INCLUDING CURED COMPOUND OF THE SAME ANODE BINDER

CROSS-REFERENCE TO RELATED APPLICATION(S)

This present application is a national phase entry under 35 U.S.C. § 371 of International Application No. PCT/KR2020/013964 filed Oct. 14, 2020, which claims priority from Korean Patent Application No. 10-2019-0138185 filed Oct. 31, 2019, and Korean Patent Application No. 10-2020-0131978 filed Oct. 13, 2020, all of which are incorporated herein by reference in their entirety.

BACKGROUND OF THE INVENTION

(a) Field of the Invention

This invention relates to anode binder materials for a lithium rechargeable battery, and an anode binder comprising the cured product of the anode binder materials.

(b) Description of the Related Art

Recently, with the expansion of the application fields of lithium rechargeable batteries from small electronic devices to large devices such as automobiles, energy storage system, and the like, various studies for improving the performances of lithium rechargeable batteries, such as increasing energy capacity and securing rapid charge speed, are progressed.

The anode of a lithium rechargeable battery consists of anode active material storing lithium ions during charge and releasing them during discharge; a conductive agent filling a space that cannot be filled with anode active material and securing electrically conductive pathway; and a binder physically binding them with a current collector, and the like.

Wherein, the anode binder not only performs a function for physically binding anode active material and a conductive agent, but also compensates volume change of anode active material during repeated charge and discharge of a battery, thereby performing an important function for physically stabilizing an anode.

However, generally known anode binders (for example styrene-butadiene-based polymer, styrene-acrylate-based polymer, and the like) may be modified at high temperature (maximum 200° C.) during manufacture of a battery, or cause side reactions with an electrolyte in a battery, and the binding force weakens during repeated charge and discharge of a battery, and thus, volume change of anode active material cannot be compensated, thus deteriorating an anode.

SUMMARY OF THE INVENTION

Technical Problem

It is an object of the invention to provide materials that can be converted into an anode binder having heat resistance, chemical resistance, excellent binding force and durability, and the like, as prerequisites for improving the performances of lithium rechargeable batteries.

Technical Solution

Specifically, according to one embodiment of the invention, there are provided anode binder materials for a lithium rechargeable battery comprising: a vulcanization accelerator comprising a metal-organic framework (MOF); styrene-butadiene-based copolymer; and sulfur molecule ($S_8$).

Advantageous Effects

The anode binder materials of one embodiment may be cured while being applied on an anode current collector, to exhibit excellent properties including heat resistance, chemical resistance, mechanical properties, and the like.

Thus, an anode binder converted from the material of one embodiment may not be modified or decomposed even if high temperature is applied when preparing an anode and an electrode assembly comprising the same, but may inhibit side reactions with an electrolyte in a battery, maintain excellent binding force even during repeated charge/discharge of a battery, and effectively compensate volume change of anode active material, thereby contributing to improvement in the performances of lithium rechargeable batteries.

DETAILED DESCRIPTION OF THE EMBODIMENTS

Throughout the specification, unless otherwise defined, "copolymerization" may mean block copolymerization, random copolymerization, graft copolymerization or alternating copolymerization, and "copolymer" may mean block copolymer, random copolymer, graft copolymer or alternating copolymer.

In drawings, a thickness is enlarged so as to clearly express various layers and regions. Throughout the specification, the same reference numerals are used for similar parts. When it is described that a part such as a layer, a film, a region, a plate, and the like is "above" or "on" the other part, it not only includes a case wherein a part is "right above" the other part, but also includes a case wherein other parts exist therebetween. To the contrary, when it is described that a part is "right above" the other part, it means that there are no other parts therebetween.

Hereinafter, embodiments of the invention will be explained in detail. However, these are presented only as illustrations of the invention, the present invention is not limited thereby, and the present invention is only defined by the categories of the appended claims.

Anode Binder Materials for Lithium Rechargeable Battery

According to one embodiment of the invention, there are provided anode binder materials for a lithium rechargeable battery comprising: a vulcanization accelerator comprising a metal-organic framework (MOF), as well as styrene-butadiene-based copolymer and sulfur molecule ($S_8$).

In the anode binder material of one embodiment, the styrene-butadiene-based copolymer is a polymer of a chain structure comprising styrene repeat units and butadiene repeat units, and the sulfur molecule ($S_8$) corresponds to a vulcanizing agent capable of vulcanizing with the styrene-butadiene-based copolymer.

Wherein, "vulcanization" means a reaction of forming crosslink comprising a disulfide bond (S—S) between the inside of a polymer chain and other polymer chains, thereby forming a cured product of a network structure.

The materials consisting only of the styrene-butadiene-based copolymer and the sulfur molecule should be heated to a high temperature of about 159° C. or more, so that vulcanization may be progressed.

The sulfur molecule ($S_8$) is a molecule in the form of octahedral ring, and may be ring-opened at a temperature of about 159° C. or more to form radicals, and then, can be polymerized (vulcanized) to the styrene-butadiene-based copolymer.

However, the melting point of the styrene-butadiene-based copolymer is about 160 to 200° C., and at higher temperature, it may be modified or decomposed, and thus, vulcanization may be progressed slowly, and the properties of the vulcanization product may be deteriorated.

In this regard, it is known that during common vulcanization, a vulcanization accelerator such as N,N-Dicyclohexyl-2-benzothiazolesulfenamide (DCBS), ZnO, and the like, is used to change sulfur into an active state and promote vulcanization.

However, only with a general vulcanization accelerator, the speed of vulcanization may be partly increased, but it is insufficient for remarkably improving the properties of the cured product.

Thus, according to one embodiment of the invention, there are provided anode binder materials comprising a metal-organic framework (MOF), in addition to styrene-butadiene-based copolymer and sulfur molecule.

The metal-organic framework has a two-dimensional or three-dimensional structure comprising metal ion or cluster; and organic ligand coordinated thereto.

The metal-organic framework has unique pores due to the coordinate bond between metal and organic material, and the size and shape of the pores vary according to the kind of the metal-organic framework. During vulcanization, due to the existence of the pores, unreacted monomers come in and out of the pores, and thus, polymer-polymer crosslinking reactions are more effectively progressed than reactions of polymer-unreacted monomers.

Common vulcanization accelerators such as DCBS, ZnO, and the like effectively cause crosslinking in terms of a reaction speed, while the metal-organic framework selectively promotes crosslinking between polymer chains.

Furthermore, common vulcanization accelerators such as DCBS, ZnO, and the like only promote vulcanization and do not have structural effects, while the metal-organic framework, due to the existence of unique pores, can improve mobility of lithium ions during manufacture of an electrode, thus contributing to improvement in battery performances.

Thus, since the anode binder materials of one embodiment comprises a vulcanization accelerator comprising the metal-organic framework (MOF), it may be rapidly cured by hot air of 70 to 90° C. applied for drying while applied on an anode current collector, and thus, can realize excellent properties including heat resistance, chemical resistance, mechanical properties, and the like.

Furthermore, a binder converted from the anode binder materials of one embodiment may not be modified or decomposed even if high temperature is applied when manufacturing an anode and an electrode assembly comprising the same, but may inhibit side reactions with an electrolyte in a battery, maintain excellent binding force even during repeated charge/discharge of a battery, and effectively compensate volume change of anode active material, thereby contributing to improvement in the performances of a lithium rechargeable battery.

Meanwhile, even if ZnBDC is used alone as a vulcanization accelerator, it may have an effect for lowering the resistance of an anode, but for further improvement of an anode in terms of adhesion and expansion rate, other vulcanization accelerators such as ZnO, and the like may be added.

As described above, since ZnBDC performs its special function as well as a function for promoting vulcanization, even if it is used alone, the effect for lowering the resistance of an anode may be obtained.

However, if ZnBDC is used alone as a vulcanization accelerator without assistance of other vulcanization accelerators such as ZnO, and the like, there is a limit to increase in a vulcanization (crosslinking) degree. In this regard, in order to obtain an anode exhibiting higher anode adhesion and lower expansion rate while lowering the resistance of an anode, other vulcanization accelerators such as ZnO, and the like may be added to ZnBDC, to increase a vulcanization (crosslinking) degree. Other vulcanization accelerators such as DCBS, ZnO, and the like will be explained in detail later.

Hereinafter, anode binder materials of one embodiment will be explained in detail.

Metal-Organic Framework

As the metal-organic framework, besides Zn(1,4-benzenedicarboxylate)(BDC) described below, at least one selected from the group consisting of $Zn_4O(4,4',4''$-[benzene-1,3,5-triyl-tris(ethyne-2,1-diyl)]tribenzoate)(biphenyl-4,4'-dicarboxylate) (BTE)(BPDC), $Zn_4O(1,3,5$-benzenetribenzoate) (BTB) and $Zn_4O(4,4',4''$-[benzene-1,3,5-triyl-tris(benzene-4,1-diyl)]tribenzoate) (BBC) having the same structures and functions as Zn(1,4-benzenedicarboxylate) (BDC) may be selected.

Styrene-butadiene-Based Copolymer

The styrene-butadiene-based copolymer is copolymer of a chain structure comprising styrene repeat units and butadiene repeat units, and is not specifically limited as long as it can be converted into a network structure by vulcanization.

For example, the styrene-butadiene-based copolymer may be selected from styrene-butadiene-based copolymers commonly known as an anode binder, and it may comprise acryl-styrene-butadiene copolymer, styrene-butadiene polymer, or a mixture thereof, and may further comprise butadiene polymer.

Meanwhile, the styrene-butadiene-based copolymer is commercially available or it may be prepared for use.

In case the styrene-butadiene-based copolymer is prepared for use, it may be prepared in the form of a latex comprising styrene-butadiene-based copolymer particles by emulsion polymerization of a monomer mixture comprising styrene monomers, butadiene monomers, a polymerization initiator commonly known in the art, and optionally, acryl monomers, and the like at a common polymerization temperature.

Wherein, as the polymerization initiator, at least one polymerization initiator selected from the group consisting of paramenthane hydroperoxide (PMHP), potassium persulfate, sodium persulfate, ammonium persulfate and sodium bisulfate may be used.

Mixing Ratio of Styrene-Butadiene-Based Copolymer, Sulfur Molecule, and Metal-Organic Framework When preparing the anode binder materials of one embodiment, based on 100 parts by weight of the styrene-butadiene-based copolymer, the sulfur molecule may be mixed in an amount of 0.5 to 3 parts by weight, and the metal-organic framework may be mixed in an amount of 0.5 to 2 parts by weight.

Within this range, crosslinks comprising disulfide (S—S) bonds are formed in an optimum level between the inside of the styrene-butadiene-based copolymer chain and other polymer chains, and thus, acceleration of vulcanization and involvement in reaction of the metal-organic framework may be effectively achieved. However, within the above range, mixing of the materials may be modified according to the aimed properties.

Specifically, based on parts by weight of the styrene-butadiene-based copolymer, the content of the sulfur molecule may be 0.05 or more, 0.1 or more, 0.5 or more, or 1 or more, and 5 or less, 3 or less, 1 or less, or 0.5 or less. And, the content of the metal-organic framework may be 0.05 or more, 0.1 or more, 0.5 or more, or 1 or more, and 4 or less, 2 or less, 1 or less, or 0.5 or less.

Within the above exemplified ranges, as the content of the sulfur molecule increases, heat resistance, chemical resistance and mechanical properties of the final anode binder may be improved. And, as the content of the metal-organic framework increases, the vulcanization may be accelerated, and the properties of the final anode binder may be further improved.

Vulcanization Accelerators Other Than a Metal-Organic Framework

Meanwhile, when formulating the anode binder materials of one embodiment, it is possible to add common vulcanization accelerators such as N,N-dicyclohexyl-2-benzothiazolesulfenamide (DCBS), ZnO, and the like.

The N,N-dicyclohexyl-2-benzothiazolesulfenamide is a kind of organic vulcanization accelerators, and generally known to reduce the amount of vulcanizing agent (namely, the sulfur molecule) used for polymer, increase vulcanization speed to shorten vulcanization time, decrease vulcanization temperature, and improve heat resistance, chemical resistance, binding force, durability, and the like of the vulcanization product.

And, the zinc oxide is a kind of inorganic vulcanization accelerators, and is generally known to mainly accelerate initial vulcanization of polymer comprising —COOH, and assist in the function of the organic vulcanization accelerator.

Thus, when formulating the anode binder materials of one embodiment, the N,N-dicyclohexyl-2-benzothiazolesulfenamide and zinc oxide may be mixed and added.

For example, based on 100 parts by weight of the styrene-butadiene-based copolymer, the N,N-dicyclohexyl-2-benzothiazolesulfenamide may be added in an amount of 0.5 to 2 parts by weight, and the zinc oxide may be added in an amount of 0.5 to 5 parts by weight, wherein the weight ratio of the N,N-dicyclohexyl-2-benzothiazolesulfenamide and zinc oxide may be 1:3.5 to 1:5.

Within the above ranges, vulcanization speed of the styrene-butadiene-based copolymer and the sulfur molecules may further increase, vulcanization temperature may decrease, sulfur molecules remaining after vulcanization may decrease, and the properties of a vulcanization product may be improved.

However, the present invention is not limited thereby, and comprehensively considering the kind of the styrene-butadiene-based copolymer, the aimed properties of anode binder, and the like, the kind and added amount of the vulcanization accelerators may be determined.

Solvent and Emulsifier

And, the anode binder materials of one embodiment may further comprise water as a solvent.

In this case, in order to improve dispersibility, stability, and the like, at least one emulsifier selected from the group consisting of sodium lauryl sulfate (SLS), sodium laureth sulfate (SLES) and ammonium lauryl sulfate (ALS) may be further included.

For example, based on parts by weight of the styrene-butadiene-based copolymer, the emulsifier may be included in an amount of 0.2 to 2 parts by weight.

Besides the above explained components, it is possible to further add additives commonly known in the art, and the detailed explanations thereof are omitted.

An Anode Binder Composition for a Lithium Rechargeable Battery

According to another embodiment of the invention, there is provided an anode binder composition for a lithium rechargeable battery comprising: styrene-butadiene-based copolymer vulcanized in the presence of a vulcanization accelerator comprising a metal-organic framework (MOF).

The styrene-butadiene-based copolymer vulcanized in the presence of a vulcanization accelerator comprising a metal-organic framework (MOF) is structurally stable, and may exhibit improved heat resistance, chemical resistance, mechanical properties, and the like, compared to styrene-butadiene-based copolymer vulcanized in the presence of a vulcanization accelerator that does not comprise the metal-organic framework.

Wherein, the metal-organic framework has unique pores by coordinate bond between metal and organic material, and the pore size and shape vary according to the kind of metal-organic framework. Due to the existence of the pores, unreacted monomers come in and out of the pores during vulcanization (crosslinking) reaction, and thus, polymer-polymer crosslinking reactions may be more effectively progressed than reactions of polymer-unreacted monomers.

Wherein, common vulcanization accelerators such as DCBS, ZnO, and the like effectively cause crosslinking in terms of reaction speed, while metal-organic framework selectively promotes crosslinking between polymer chains.

Furthermore, common vulcanization accelerators such as DCBS, ZnO, and the like only accelerates vulcanization and do not have structural effects, in the case of the metal-organic framework, due to the existence of unique pores, mobility of lithium ions in an anode comprising the same may be improved, thus lowering internal resistance of the anode, and contributing to increase in CC (Constant current) area to the capacity of a lithium rechargeable battery.

Thus, the binder composition of one embodiment may not be modified or decompose even if high temperature is applied during manufacturing processes of an anode and an electrode assembly comprising the same, but may inhibit side reactions with an electrolyte in a battery, maintain excellent binding force even during repeated charge/discharge of a battery, and effectively compensate volume change of anode active material, thereby contributing to improvement in the performances of a lithium rechargeable battery.

Hereinafter, an anode binder composition of one embodiment will be explained in detail, with explanations overlapped with the above omitted.

Existing Form of Metal-Organic Framework in Anode Binder Composition

In the binder composition of one embodiment, the metal-organic framework (MOF) may exist while being bonded to the vulcanized styrene-butadiene-based copolymer, or exist independently from the vulcanized styrene-butadiene-based copolymer.

Specifically, during a vulcanization process of styrene-butadiene-based copolymer in the presence of a vulcanization accelerator comprising the metal-organic framework (MOF), simultaneously with vulcanization of styrene-butadiene-based copolymer, the metal-organic framework (MOF) may be partly complexed with styrene-butadiene-based copolymer.

More specifically, while stabilized metal ions in the metal-organic framework (MOF) involve in vulcanization as a kind of a catalyst, the structure of the metal-organic framework (MOF) may partly changes, and be complexed with styrene-butadiene-based copolymer. As such, while being complexed with styrene-butadiene-based copolymer, catalytic efficiency is higher, and vulcanization may be more effectively progressed.

Wherein, although most of the metal ions involved in vulcanization may return to the metal-organic framework (MOF), some of them may remain in ion state.

Thus, in the final anode binder composition, most of the metal-organic frameworks (MOF) may exist independently from the vulcanized styrene-butadiene-based copolymer, and some of them may be structurally changed and remain while being complexed with the vulcanized styrene-butadiene-based copolymer.

Gel Content in Anode Binder Composition

The anode binder composition of one embodiment may have gel content calculated by the following Mathematical Formula 1 of 80% or more:

$$Gel\ content\ (\%) = M_b/M_a * 100 \quad \text{[Mathematical Formula 1]}$$

In the Mathematical Formula 1, $M_a$ is a weight measured after drying the anode binder composition at room temperature for 24 hours, and then, drying it at 80° C. for 24 hours to obtain a binder composition in the form of a film, cutting the binder film in the form of very small pellets, and then, taking 0.5 g of the binder composition, $M_b$ is the weight of copolymer remaining in mesh, after immersing the anode binder composition of which weight has been measured in 50 g of tetrahydrofuran (THF) for 24 hours, and filtering it through 200 mesh, and then, drying the mesh and the anode binder remaining in the mesh at 80° C. for 48 hours.

The gel content means a crosslinking degree of copolymer, and is calculated by the Mathematical Formula 1 and represented by insoluble fraction to electrolyte. Specifically, the gel content in the anode binder of one embodiment may be 80% or more, 81% or more, or 82% or more. If the gel content is less than 80%, electrolyte swelling may increase to deteriorate battery life. And, the upper limit of the gel content is not specifically limited, but it may be 99% or less, 98% or less, or 97% or less.

Preparation Method of an Anode Binder for a Lithium Rechargeable Battery

According to yet another embodiment of the invention, there is provided a method for preparing an anode binder composition for a lithium rechargeable battery comprising a step of: vulcanizing styrene-butadiene-based copolymer and sulfur molecules ($S_8$), in the presence of a vulcanization accelerator comprising a metal-organic framework (MOF).

It corresponds to a method for preparing an anode binder by curing the above explained anode binder materials.

Hereinafter, each step of the above embodiment will be explained in detail, with the explanations overlapped with the above omitted.

The vulcanization may be conducted at a temperature of 70 to 90° C.

For example, a temperature range for vulcanization may be 70° C. or more, or 71° C. or more, or 72° C. or more, or 73° C. or more, or 74° C. or more, or 75° C. or more, and 90° C. or less, or 89° C. or less, or 88° C. or less, or 87° C. or less, or 86° C. or less, or 85° C. or less.

And, the vulcanization may be conducted for 1 to 60 minutes.

For example, the vulcanization time may be 1 minute or more, 3 minutes or more, 5 minutes or more, 7 minutes or more, or 9 minutes or more, and 60 minutes or less, 50 minutes or less, 40 minutes or less, 30 minutes or less, or 20 minutes or less.

The vulcanization may be conducted while the anode binder materials are applied on an anode current collector, as explained above.

Specifically, the binder materials of one embodiment may be mixed with anode active material; a conductive agent; an aqueous or non-aqueous solvent; and the like, and prepared as an anode slurry, and may be rapidly cured by hot air of 70 to 90° C. applied for drying while being applied on an anode current collector, thus forming an anode binder exhibiting excellent properties such as heat resistance, chemical resistance, mechanical properties, and the like.

More specifically, before the vulcanization, the method may comprise steps of: preparing anode active material slurry comprising the anode binder materials, a conductive agent, a binder, and a solvent; and applying the anode active material slurry on one side or both sides of an anode current collector.

Thus, the vulcanization may comprise steps of: heating the anode active material slurry applied on one side or both side of the anode current collector; and curing the anode binder materials in the anode active material slurry by the heat.

In the 100 wt % of the anode active material slurry, the content of the anode binder materials may be 0.1 to 0.5 wt %, the content of the anode active material may be 80 to 84 wt %, the content of the binder may be 0.5 to 2.5 wt %, and the remainder may be additives and solvents. Wherein, the content of each material may be adjusted according to common knowledge in the art.

The anode active material, conductive agent and additives, and the like will be explained later.

Anode for a Lithium Rechargeable Battery

According to yet another embodiment of the invention, there is provided an anode for a lithium rechargeable battery comprising: an anode current collector; and an anode active material layer positioned on the anode current collector, and comprising styrene-butadiene-based copolymer vulcanized in the presence of a vulcanization accelerator comprising a metal-organic framework (MOF), anode active material, and a conductive agent.

Since the anode of one embodiment comprises a binder converted from the anode binder materials of the above explained one embodiment, side reactions with an electrolyte may be inhibited in a battery, excellent binding force may be maintained even during repeated charge/discharge of a battery, and volume change of anode active material may be effectively compensated, thereby contributing to improvement in the performances of a lithium rechargeable battery.

In the anode of one embodiment, the anode active material layer independently comprises material capable of intercalating/deintercalating lithium ions, lithium metal, lithium metal alloy, material capable of doping and dedoping lithium, or transition metal oxide.

As the material capable of reversibly intercalating/deintercalating lithium ions, any carbonaceous anode active materials commonly used in lithium ion rechargeable batteries may be used, and as representative examples thereof, crystalline carbon, amorphous carbon or a combination thereof may be used. As the examples of the crystalline carbon, graphite such as amorphous, plate, flake, spherical or fiber type natural graphite or artificial graphite may be mentioned, and as the examples of the amorphous carbon, soft carbon (low temperature baked carbon) or hard carbon, mesophase pitch carbide, baked coke, and the like may be mentioned.

As the lithium metal alloy, alloys of lithium and metal such as Na, K, Rb, Cs, Fr, Be, Mg, Ca, Sr, Si, Sb, Pb, In, Zn, Ba, Ra, Ge, Al or Sn may be used.

As the material capable of doping and dedoping lithium, Si, $SiO_x$ ($0<x<2$), Si—C complex, Si-Q alloy (wherein Q is alkali metal, alkali earth metal, Group 13 to Group 16 elements, transition metal, rare earth element or combinations thereof, provided that it is not Si), Sn, $SnO_2$, Sn—C complex, Sn—R (wherein R is alkali metal, alkali earth metal, Group 13 to Group 16 elements, transition metal, rare earth element or combinations thereof, provided that it is not Sn), and the like may be mentioned. As specific elements of Q and R; Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po or combinations thereof may be mentioned.

As the transition metal oxide, vanadium oxide, lithium vanadium oxide, and the like may be mentioned.

For example, the anode active material layer may comprise at least one carbonaceous anode active material selected from artificial graphite, natural graphite, soft carbon, hard carbon, or mixtures thereof.

Meanwhile, the anode active material layer may further comprise a conductive agent. The conductive agent is used to give conductivity to an electrode, and any conductive material may be used as long as it does not cause chemical change in the constituted battery, and for example, carbonaceous material such as natural graphite, artificial graphite, carbon black, acetylene black, ketjen black, carbon fiber, and the like; metallic material, such as metal powder or metal fiber of copper, nickel, aluminum, silver, and the like; conductive polymer such as polyphenylene derivatives, and the like; or mixtures thereof may be used.

For example, the anode active material may independently comprise at least one carbonaceous conductive agent selected from the group consisting of acetylene black, carbon black, ketjen black, carbon fiber and mixtures thereof.

The conductive agent is not specifically limited as long as it has conductivity without inducing chemical change in the constituted battery, and for example, carbonaceous material such as natural graphite, artificial graphite, carbon black, acetylene black, ketjen black, carbon fiber, and the like; metallic material, such as metal powder or metal fiber of copper, nickel, aluminum, silver and the like; conductive polymer such as polyphenylene derivatives, and the like; or mixtures thereof may be used.

As the current collector, copper foil, nickel foil, stainless steel foil, titanium foil, nickel foam, copper foam, a conductive metal-coated polymer substrate, or combinations thereof may be used.

Lithium Rechargeable Battery

According to yet another embodiment of the invention, there is provided a lithium rechargeable battery comprising: the anode of one embodiment; an electrolyte; and a cathode.

The lithium rechargeable battery of one embodiment may further comprise a separator between the cathode and the anode.

The lithium rechargeable battery may be classified into cylindrical, prismatic, coin type, pouch type, and the like according to the shape used, and into bulk type and thin film type according to size. Since the construction and manufacturing method of batteries are widely known, minimum explanations will be added.

The cathode comprises a current collector and a cathode active material layer formed on the current collector.

As the cathode active material, compounds capable of reversibly intercalating and deintercalating lithium (lithiated intercalation compounds) may be used. Specifically, one or more selected from composite oxide of metal such as cobalt, manganese, nickel or combinations thereof and lithium may be used, and as specific examples thereof, compounds represented by one of the following Chemical Formulas may be used: $Li_aA_{1-b}R_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, $0 \leq c \leq 0.05$); $Li_aNi_{1-b-c}Co_bR_cD_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cD_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 \leq \alpha \leq 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 \leq \alpha \leq 2$); $Li_aNi_bE_cG_dO_2$ (wherein, $0.90 \leq a \leq 1.8$, $0 \leq b \leq 0.9$, $0 \leq c \leq 0.5$ and $0.001 \leq d \leq 0.1$.); $Li_aNi_bCo_cMn_dGeO_2$ (wherein, $0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ (wherein, $0.90 \leq a \leq 1.8$ and $0.001 \leq b \leq 0.1$.); $Li_aCoG_bO_2$ (wherein, $0.90 \leq a \leq 1.8$ and $0.001 \leq b \leq 0.1$.); $Li_aMnG_bO_2$ (wherein, $0.90 \leq a \leq 1.8$ and $0.001 \leq b \leq 0.1$.); $Li_aMn_2G_bO_4$ (wherein, $0.90 \leq a \leq 1.8$ and $0.001 \leq b \leq 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above Chemical Formulas, A is Ni, Co, Mn or a combination thereof; R is Al, Ni, Co, Mn, Cr, Fe, Mg, Sr, V, rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

The compounds having a coating layer on the surface may be used, or the above compound and the compound having a coating layer may be used in combination. The coating layer is a coating element compound, and may comprise oxide, hydroxide of coating element, oxyhydroxide of coating element, oxycarbonate of coating element, or hydroxyxcarbonate of coating element. The compounds making up the coating layer may be amorphous or crystalline. As the coating elements included in the coating layer, Mg, Al, Co, K, Na, Ca, Si, Ti, V, Sn, Ge, Ga, B, As, Zr or a mixture thereof may be used. As a process of forming a coating layer, any coating methods can be used as long as it can coat such elements on the above compounds without having adverse influence on the properties of cathode active material (for example, spray coating, immersion, and the like), and it can be easily understood to one of ordinary knowledge in the art, and thus, detailed explanations thereof will be omitted.

The cathode active material layer also comprises a binder and a conductive agent.

The binder performs functions for sufficiently attaching cathode active material particles to each other, and sufficiently attaching cathode active material to a current collector, and as representative examples thereof, polyvinyl alcohol, carboxymethyl cellulose, hydroxypropyl cellulose, diacetyl cellulose, polyvinyl chloride, carboxylated polyvinyl chloride, polyvinyl fluoride, ethylene oxide containing polymer, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be used, but it is not limited thereto.

The conductive agent is used to give conductivity to an electrode, and any conductive material may be used as long as it does not cause chemical change in the constituted battery, and for example, natural graphite, artificial graphite, carbon black, acetylene black, ketjen black, carbon fiber, metal powder or metal fiber of copper, nickel, aluminum, silver, and the like may be used, and conductive material such as polyphenylene derivatives, and the like may be used alone or in combinations.

As the current collector, Al may be used, but it is not limited thereto.

The anode and the cathode are respectively prepared by mixing active material, a conductive agent and a binder in a solvent to prepare an active material composition, and coating the composition on a current collector. Such an electrode manufacturing method is widely known in the art, and detailed explanations are omitted herein. As the solvent, N-methylpyrrolidone, and the like may be used, but it is not limited thereto.

The electrolyte comprises a non-aqueous organic solvent and lithium salts.

The non-aqueous organic solvent functions as a medium where ions participating in the electrochemical reactions of a battery can move.

As the non-aqueous organic solvent, carbonate-based, ester-based, ether-based, ketone-based, alcohol-based, or aprotic solvents may be used. As the carbonate-based solvent, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like may be used, and as the ester-based solvent, methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like may be used.

As the ether-based solvent, dibutyl ether, tetraglyme, diglyme, dimethoxyethane, 2-methyltetrahydrofuran, tetrahydrofuran, and the like may be used, and as the ketone-based solvent, cyclohexanone, and the like may be used. And, as the alcohol-based solvent, ethylalcohol, isopropyl alcohol, and the like may be used, and as the aprotic solvent, nitriles such as R—CN (R is a C2 to C20 linear, branched, or cyclic hydrocarbon group, and may comprise double bond aromatic ring or ether bond), amides such as dimethylformamide, and the like, dioxolanes such as 1,3-dioxolane, sulfolanes, and the like may be used.

The non-aqueous organic solvent may be used alone or in combinations, and in case used in combinations, the mixing ratio may be appropriately controlled according to the aimed battery performances, which can be easily understood to one of ordinary knowledge in the art.

And, as the carbonate-based solvent, it is preferable to use cyclic carbonate and chain carbonate in combination. In this case, when mixing cyclic carbonate and chain carbonate at a volume ratio of about 1:1 to about 1:9, excellent electrolyte performances may be exhibited.

The non-aqueous organic solvent may further comprise the aromatic carbonate-based organic solvent in addition to the carbonate-based solvent, wherein, the carbonate-based solvent and the aromatic hydrocarbon-based organic solvent may be mixed at a volume ratio of about 1:1 to about 30:1.

As the aromatic hydrocarbon-based organic solvent, aromatic hydrocarbon-based compounds of the following Chemical Formula 1 may be used.

[Chemical Formula 1]

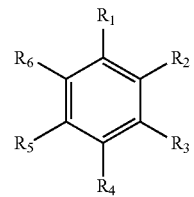

In the Chemical Formula 1, $R_1$ to $R_6$ are each independently, hydrogen, halogen, a C1 to C10 alkyl group, a C1 to C10 haloalkyl group, or a combination thereof.

As the aromatic hydrocarbon-based organic solvent, benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or combinations thereof may be used.

The non-aqueous electrolyte may further comprise vinylene carbonate or an ethylene carbonate-based compound of the following Chemical Formula 2 so as to improve battery life.

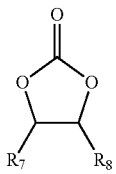

[Chemical Formula 2]

In the Chemical Formula 2, $R_7$ and $R_8$ are each independently, hydrogen, halogen, a cyano group (CN), a nitro group ($NO_2$) or a C1 to C5 fluoroalkyl group, and at least one of $R_7$ and $R_8$ is a halogen group, a cyano group (CN), a nitro group ($NO_2$) or a C1 to C5 fluoroalkyl group.

As representative examples of the ethylene carbonate-based compound, difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like may be mentioned. In case the vinylene carbonate or the ethylene carbonate-based compound is further used, the amount used may be appropriately controlled to improve life.

The lithium salts are dissolved in the non-aqueous organic solvent to act as a source of lithium ions in a battery, thus enabling basic operation of a lithium rechargeable battery, and promoting lithium ion transfer between a cathode and an anode. As representative examples of the lithium salts, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural number), LiCl, LiI, $LiB(C_2O_4)_2$ (lithium bis(oxalato) borate; LiBOB) or combinations thereof may be mentioned, and they are included as supporting electrolyte salts. The concentration of the lithium salts may be preferably within a range of 0.1 to 2.0M. When the concentration of lithium salts included is within the above range, an electrolyte has appropriate conductivity and viscosity, and thus, may exhibit excellent electrolyte performances, and effectively transfer lithium ions.

A separator separates the anode and the cathode and provides lithium ion pathway, and any separators commonly used in lithium batteries may be used. Namely, those having low resistance to ion transfer of an electrolyte and excellent electrolyte wetting capability may be used. For example, it may be selected from glass fiber, polyester, Teflon, polyethylene, polypropylene polytetrafluoroethylene (PTFE) or combinations thereof, and it may be in the form of non-woven or woven fabric. For example, in lithium ion batteries, polyolefin-based polymer separators such as polyethylene, polypropylene, and the like are mainly used, and separators coated with ceramic components or polymer material may be also used so as to secure heat resistance or mechanical strength, and it may be optionally used in a single layer or multilayer structure.

Hereinafter, preferable examples of the invention will be described. However, these examples are presented only as preferable examples of the invention, and the present invention is not limited thereby.

Preparation Example 1

To water containing 0.5 wt % of a polymerization initiator paramenthane hydroperoxide (PMHP), 61 g of butadiene, 57 g of styrene and 2 g of acrylic acid were added as monomers, 10 g of sodium lauryl sulfate was added as an emulsifier, and they were mixed, and then, polymerized at 70° C. for about 5 hours to obtain a composition comprising butadiene-styrene-acryl polymer particles.

The solid content in the composition is 30 wt %, and the number average particle diameter of the polymer particles included therein is 50 nm (measurement by dynamic light scattering (DLS) equipment).

Example 1

(1) Anode Binder Materials (acryl-styrene-butadiene Polymer+Sulfur+Zn(BDC)+DCBS+ZnO)

20 g of the composition of Preparation Example 1 was taken, and 0.2 g of sulfur ($S_8$), 0.4 g of Zn(BDC) (wherein, BDC=1,4-Benzenedicarboxylate), 0.2 g of DCBS (N,N-Dicyclohexyl-2-benzothiazolesulfenamide), and 0.7 g of ZnO were added thereto, and then, stirred for 1 hour to obtain anode binder materials of Example 1.

(2) Anode 150 g of a thickener, a carboxyl methyl cellulose aqueous solution (solid content: 1.5 wt %) and 1.5 g of a conductive agent acetylene black were mixed and stirred for 1 hour, to prepare a conductive agent dispersion.

0.5 g of the anode binder materials of Example 1 were taken and introduced in the conductive agent dispersion, and 150 g of anode active material artificial graphite (D50: 20 µm) and 20 g of distilled water were introduced therein and stirred to prepare anode active material slurry of Example 1.

A 20 µm thickness copper foil was used as a current collector, and using a comma coater, the anode active material slurry of Example 1 was coated on one side of the anode current collector (coating amount per one side: 10.8 mg/cm$^2$), and then, hot air dried in an oven of 80° C. for 10 minutes, rolled to the total thickness of 90 µm at 25° C., and vacuum dried at 120° C. to obtain an anode of Example 1.

(3) Lithium Ion Half Cell

Using the anode as a working electrode, and using a lithium metal sheet with a thickness of 150 µm as a reference electrode, a polyethylene separator (thickness: 20 µm, porosity: 40%) was inserted between the working electrode and the reference electrode, and it was introduced into a battery container, electrolyte was injected, and then, a lithium rechargeable battery was manufactured in the form of 2032 half-cell according to a common manufacturing method.

As the electrolyte, in mixed solvents of ethylene carbonate (EC), propylene carbonate (PC) and diethyl carbonate (DEC) (EC:PC:DEC=3:2:5 weight ratio), $LiPF_6$ was dissolved at the concentration of 1.3 M, and based on the total weight of the electrolyte, 10 wt % of additive fluoroethylene carbonate (FEC) was added.

Example 2

(1) Anode Binder Materials (acryl-styrene-butadiene Polymer+Sulfur+Zn(BDC)+DCBS+ZnO)

20 g of the composition of Preparation Example 1 was taken, and 0.2 g of sulfur ($S_8$), 0.4 g of Zn(BDC), 0.1 g of DCBS, and 0.7 g of ZnO were added thereto, and then, stirred for 1 hour to obtain anode binder materials of Example 2.

(2) Preparation of Anode and Lithium Ion Half Cell

The anode and lithium ion half cell of Example 2 were prepared by the same method as Example 1, except that the anode binder materials of Example 2 were used instead of the binder composition of Example 1.

Example 3

(1) Anode Binder Materials (acryl-styrene-butadiene Polymer+Sulfur+Zn(BDC)+DCBS+ZnO)

20 g of the composition of Preparation Example 1 was taken, and 0.2 g of sulfur ($S_8$), 0.8 g of Zn(BDC), 0.2 g of DCBS, and 0.7 g of ZnO were added thereto, and then, stirred for 1 hours to obtain anode binder materials of Example 3.

(2) Preparation of Anode and Lithium Ion Half Cell

The anode and lithium ion half cell of Example 3 were prepared by the same method as Example 1, except that the anode binder materials of Example 3 were used instead of the binder composition of Example 1.

Example 4

(1) Anode Binder Materials (acryl-styrene-butadiene Polymer+Sulfur+Zn(BDC))

20 g of the composition of Preparation Example 1 was taken, and 0.2 g of sulfur ($S_8$) and 0.4 g of Zn(BDC) were added thereto, and then, stirred for 1 hours to obtain anode binder materials of Example 4.

(2) Preparation of Anode and Lithium Ion Half Cell

The anode and lithium ion half cell of Example 4 were prepared by the same method as Example 1, except that the anode binder materials of Example 4 were used instead of the binder composition of Example 1.

Comparative Example 1

(1) Anode Binder Material (acryl-styrene-butadiene Polymer Alone)

The composition of Preparation Example 1 was used as a binder composition of Comparative Example 1.

(2) Preparation of Anode and Lithium Ion Half Cell

The anode and lithium ion half cell of Comparative Example 1 were prepared by the same method as Example 1, except that the anode binder material of Comparative Example 1 was used instead of the binder composition of Example 1.

Comparative Example 2

(1) Preparation of Anode Binder Materials (acryl-styrene-butadiene Polymer+Sulfur+DCBS)

20 g of the composition of Preparation Example 1 was taken, and 0.2 g of sulfur ($S_8$) and 0.2 g of DCBS were added thereto, and then, stirred for 1 hour to obtain the anode binder composition of Comparative Example 2.

(2) Preparation of Anode and Lithium Ion Half Cell

The anode and lithium ion half cell of Comparative Example 2 were prepared by the same method as Example 1, except that the binder composition of Comparative Example 2 was used instead of the binder composition of Example 1.

Comparative Example 3

(1) Preparation of Anode Binder Materials (acryl-styrene-butadiene Polymer+Sulfur+ZnO)

20 g of the composition of Preparation Example 1 was taken, and 0.2 g of sulfur ($S_8$) and 0.7 g of ZnO were added thereto, and then, stirred for 1 hour to obtain the anode binder composition of Comparative Example 3.

(2) Preparation of Anode and Lithium Ion Half Cell

The anode and lithium ion half cell of Comparative Example 3 were prepared by the same method as Example 1, except that the binder composition of Comparative Example 3 was used instead of the binder composition of Example 1.

Experimental Example 1: Evaluation of Anode Binder Composition

In the Examples 1 to 4 and Comparative Examples 1 to 3, in the process of coating anode active material slurry comprising anode binder materials, conductive agent dispersion, anode active material, and additional solvents on an anode current collector and heating, the solvents in the anode active material slurry are removed to form an anode active material layer, and simultaneously, vulcanization of the anode binder materials occur to convert into a binder. Due to such a preparation process, it is impossible to separate a binder (namely, vulcanized styrene-butadiene-based copolymer) from each final anode of Examples 1 to 4 and Comparative Examples 1 to 3.

However, in this experiment, for evaluation, the anode binder materials of Examples 1 to 4 and Comparative Examples 1 to 3 themselves are dried in an oven of 80° C. for 24 hours to prepare an anode binder composition.

The prepared anode binder compositions of Examples 1 to 4 and Comparative Examples 1 to 3 were respectively evaluated under the following conditions, and the results were reported in the following Table 1.

Gel content in the binder composition: First, the binder composition was dried at room temperature for 24 hours, and then, dried at 80° C. for 24 hours to obtain a binder composition in the form of a film, and the binder film was cut into very small pellets, and then, 0.5 g of the binder composition was taken and the exact weight was measured (Ma).

And, the binder particles of which weight had been measured was immersed in about 50 g of tetrahydrofuran (THF) at room temperature for 24 hours, filtered using 200 mesh sieve, and dried at 80° C. for 48 hours, and then, the exact weight was measured (Mb).

Gel content was calculated by the following Mathematical Formula 1.

$$Gel\ content\ (\%) = M_b/M_a * 100 \quad \text{[Mathematical Formula 1]}$$

TABLE 1

|  | Gel content |
|---|---|
| Example 1 | 82.7% |
| Example 2 | 77.6% |
| Example 3 | 77.9% |
| Example 4 | 76.8% |
| Comparative Example 1 | 71.1% |
| Comparative Example 2 | 74.4% |
| Comparative Example 3 | 74.6% |

In the Table 1, it can be confirmed that gel contents in the anode binder compositions of Examples 1 to 4 are higher, compared to Comparative Examples 1 to 3.

Wherein, the gel content means a crosslinking degree of copolymer, and thus, it can be seen that the vulcanization (crosslinking) degrees of vulcanized styrene-butadiene-based copolymers in the anode binder compositions of Examples 1 to 4 are higher, compared to Comparative Examples 1 to 3.

Such results are related to the involvement of the metal-organic framework (MOF) in vulcanization. As explained above, while stabilized metal ions in the metal-organic framework (MOF) involve in vulcanization as a kind of a catalyst, the structure of the metal-organic framework (MOF) partially changes and it may be complexed with styrene-butadiene-based copolymer. As such, it is inferred that while the metal-organic framework (MOF) is complexed with styrene-butadiene-based copolymer, catalytic efficiency is higher, and vulcanization is more effectively progressed, and thus, the vulcanization (crosslinking) degree of vulcanized styrene-butadiene-based copolymer increases.

Experimental Example 2: Evaluation of Anode and Lithium Rechargeable Battery

The anodes and lithium rechargeable batteries of Example 1 to 4 and Comparative Example 1 to 3 were evaluated under the following conditions, and the results were reported in the following Table 2.

Anode adhesion: In a constant temperature change of 25° C., the anode active material layer of each anode was adhered to a glass substrate, and when pulling the anode at peel speed of 5 mm/min and peel angle of 180° C., a peel force of the anode active material layer of the anode from the glass substrate was measured.

Volume resistivity of anode active material layer (coating layer): Using AC resistance measurement device (Manufacturing company: Hioki), after adjusting SOC100 to 4.25V/0.05 C cut-off, volume resistivity of each anode ($\rho v = V/I \times \pi r^2/h$) was measured at 1 KHz.

Discharge property of battery: In a constant temperature change of 25° C., each lithium ion half cell was discharged three times in CC/CV mode at 1 C from 1.5V to 5 mV, and then, discharged in CC mode at 1 C, and discharge capacity in CC area to the total discharge capacity was converted into percentage according to the following Mathematical Formula 2.

=100%*{(1.0 C CC)})/{(1.0 C CC/CV)}    [Mathematical Formula 2]

And, in a constant temperature change of 25° C., each lithium ion half cell was discharged three times in CC/CV mode at 0.5 C from 1.5V to 5 mV, and then, discharged in CC mode at 0.5 C, and discharge capacity in CC area to the total discharge capacity was converted into percentage according to the following Mathematical Formula 3.

=100%*{(0.5 C CC)})/{(0.5 C CC/CV)}    [Mathematical Formula 3]

Anode expansion rate: After evaluating discharge property, each battery was decomposed to recover an anode. Each recovered anode was washed with a DMC (dimethyl carbonate) solvent and dried at room temperature using an air blower within a few minutes, and then, the thickness was measured. The measured thickness was input in the following Formula, thus calculating expansion rate of the anode.

=100%*{(thickness of discharged anode of battery)−(thickness of rolled anode}/{(thickness of rolled anode)−(thickness of copper foil)}    [Anode expansion rate]

Wherein, each term is defined as follows:
Thickness of discharged anode of a battery=thickness of anode when a lithium ion battery is discharged one time
Thickness of rolled anode=thickness of anode before a lithium ion battery is assembled
Thickness of copper foil=thickness of an anode current collector in the rolled electrode

TABLE 2

|  | Anode adhesion | Volume resistivity of anode active material layer | (0.5 C CC)}/ {(0.5 C CC/CV) | (1.0 C CC)}/ {(1.0 C CC/CV) | Anode expansion rate |
|---|---|---|---|---|---|
| Example 1 | 23.9 gf/cm | 46.3 mΩ · cm | 76.4% | 44.3% | 26.3% |
| Example 2 | 20.6 gf/cm | 51.2 mΩ · cm | 73.1% | 41.1% | 28.7% |
| Example 3 | 21.7 gf/cm | 50.1 mΩ · cm | 74.1% | 41.5% | 27.6% |
| Example 4 | 18.8 gf/cm | 49.8 mΩ · cm | 73.1% | 42.0% | 29.9% |
| Comparative Example 1 | 16.8 gf/cm | 63.1 mΩ · cm | 71.9% | 33.1% | 30.9% |
| Comparative Example 2 | 19.7 gf/cm | 52.7 mΩ · cm | 72.6% | 38.1% | 29.7% |
| Comparative Example 3 | 20.1 gf/cm | 51.5 mΩ · cm | 72.6% | 40.6% | 29.2% |

In the Table 2, comparing Comparative Example 1 to 3, it appears that in case materials comprising acryl-styrene-butadiene polymer and sulfur molecule are cured while coated on an anode current collector (Comparative Examples 2 and 3), binding force and durability of the cured product are improved compared to acryl-styrene-butadiene polymer itself (Comparative Example 1), and side reactions with an electrolyte is inhibited, and thus, resistance decreases.

And, compared to Comparative Examples 2 and 3, Examples 1 to 4 exhibit the result of further lowering volume resistivity of an anode active material layer, and such an improved result is judged to result from Zn(BDC).

Specifically, the metal-organic framework, due to coordination bond of metal and organic material, has unique pores, and the pore size and shape vary according to the kind of the metal-organic framework. During vulcanization (crosslinking), due to the existence of the pores, unreacted monomers come in and out of the pores, and thus, polymer-polymer crosslinking may be effectively achieved than reactions between polymer-unreacted monomers.

Wherein, common vulcanization accelerators such as DCBS, ZnO, and the like effectively cause crosslinking in terms of reaction speed, while the metal-organic framework selectively promotes crosslinking between polymer chains.

Furthermore, common vulcanization accelerators such as DCBS, ZnO, and the like only accelerates vulcanization and do not have structural effects, while in the case of the metal-organic framework, due to the existence of unique pores, mobility of lithium ions in an anode comprising the same is improved, thus decreasing internal resistance of an anode and contributing to increase in CC (Constant current) area compared to the capacity of a lithium rechargeable battery.

Thus, since each binder materials of Examples 1 to 4 comprise Zn(BDC) as vulcanization accelerators, compared to Comparative Example 2 comprising DCBS only as a vulcanization accelerator and Comparative Example 3 comprising ZnO only as a vulcanization accelerator, it can more effectively accelerate vulcanization of styrene-butadiene-based copolymer and sulfur molecule ($S_8$), and remarkably improve the performances of anode and lithium rechargeable battery applying the vulcanization product.

Meanwhile, Examples 1 to 4 commonly exhibit the effect of lowering resistance of an anode, and particularly, Examples 1 to 3 exhibit higher anode adhesion and lower expansion rate than Example 4, which is judged to result from the additional inclusion of DCBS, ZnO, and the like as vulcanization accelerators.

As explained above, since ZnBDC performs its unique function as well as vulcanization accelerating function, Examples 1 to 4 exhibit the effect of lowering resistance of an anode.

However, from the higher anode adhesion and lower expansion rate in Examples 1 to 3 than Example 4, it appears that in case ZnBDC is used alone as a vulcanization accelerator without assistance of other vulcanization accelerators such as DCBS, ZnO, and the like, there is a limit to increase in vulcanization (crosslinking) degree.

In this regard, even if ZnBDC is used alone as a vulcanization accelerator, the effect of lowering resistance of an anode may be obtained, but in order to obtain an anode further improved in terms of adhesion and expansion rate, other vulcanization accelerators such as DCBS, ZnO, and the like may be added.

The present invention is not limited to the above Examples but may be prepared in various forms, and it is understood to one of ordinary knowledge in the art that the present invention can be practiced in other specific forms without changing the technical ideas and essential features of the invention.

For example, even if the kind, use amount, and the like of each constructional element are modified within the range of the above explained embodiment, effects equivalent to or more excellent than the Examples 1 to 4 can be realized.

Therefore, it should be understood that above described Examples are exemplary and are not limitative in all aspects.

What is claimed is:

1. An anode binder material for a lithium rechargeable battery, comprising
   a vulcanization accelerator comprising a metal-organic framework;
   a styrene-butadiene-based copolymer; and
   $S_8$,
   wherein the metal-organic framework comprises Zn(1,4-Benzenedicarboxylate), $Zn_4O$ (4,4',4''-[benzene-1,3,5-triyl-tris(ethyne-2,1-diyl)]tribenzoate) (biphenyl-4,4'-dicarboxylate), $Zn_4O$ (4,4',4''-[benzene-1,3,5-triyl-tris(benzene-4,1-diyl)]tribenzoate), or a mixture thereof,
   wherein the $S_8$ is included in an amount of 0.5 to 3 parts by weight, and the metal-organic framework is included in an amount of 0.5 to 2 parts by weight, based on 100 parts by weight of the styrene-butadiene-based copolymer.

2. The anode binder material for a lithium rechargeable battery according to claim 1, wherein the styrene-butadiene-based copolymer comprises acryl-styrene-butadiene copolymer, styrene-butadiene polymer, or a mixture thereof.

3. The anode binder material for a lithium rechargeable battery according to claim 1, wherein the vulcanization accelerator further comprises N,N-dicyclohexyl-2-benzothiazolesulfenamide, zinc oxide, or a mixture thereof.

4. The anode binder material for a lithium rechargeable battery according to claim 3, wherein, based on 100 parts by weight of the styrene-butadiene-based copolymer,
   the N,N-dicyclohexyl-2-benzothiazolesulfenamide is included in an amount of 0.5 to 2 parts by weight, and
   the zinc oxide is included in an amount of 0.5 to 5 parts by weight.

5. The anode binder material for a lithium rechargeable battery according to claim 1, further comprising at least one polymerization initiator of paramenthane hydroperoxide, potassium persulfate, sodium persulfate, ammonium persulfate or sodium bisulfate.

6. The anode binder material for a lithium rechargeable battery according to claim 1, further comprising water as a solvent.

7. The anode binder material for a lithium rechargeable battery according to claim 1, further comprising at least one emulsifier of sodium lauryl sulfate, sodium laureth sulfate or ammonium lauryl sulfate.

8. An anode binder composition for a lithium rechargeable battery, comprising: a styrene-butadiene-based copolymer vulcanized in the presence of a vulcanization accelerator comprising a metal-organic framework,
   wherein the anode binder composition has a gel content calculated by Mathematical Formula 1, of 80% or more:

$$Gel \text{ content } (\%) = M_b/M_a * 100 \qquad \text{[Mathematical Formula 1]}$$

in the Mathematical Formula 1,
   $M_a$ is a weight measured after drying the anode binder composition at room temperature for 24 hours, and then, drying it at 80° C. for 24 hours to obtain a binder composition in the form of a film, cutting the binder film in the form of pellets, and then, taking 0.5 g of the binder composition, and $M_b$ is a weight of copolymer remaining in mesh, after immersing the anode binder composition of which weight has been measured in 50 g of tetrahydrofuran for 24 hours, and filtering it through 200 mesh, and then, drying the mesh and the anode binder remaining in the mesh at 80° C. for 48 hours.

9. The anode binder composition for a lithium rechargeable battery according to claim 8, wherein the metal-organic framework comprises Zn(1,4-Benzenedicarboxylate), $Zn_4O$ (4,4',4"-[benzene-1,3,5-triyl-tris(ethyne-2,1-diyl)]tribenzoate) (biphenyl-4,4'-dicarboxylate), $Zn_4O$ (1,3,5-benzenetribenzoate), $Zn_4O$ (4,4',4"-[benzene-1,3,5-triyl-tris(benzene-4,1-diyl)]tribenzoate), or a mixture thereof.

10. A method for preparing the anode binder composition according to claim 8, the method comprising preparing an anode binder material comprising the styrene-butadiene-based copolymer, a $S_8$ and the vulcanization accelerator comprising the metal-organic framework, and vulcanizing the styrene-butadiene-based copolymer and the $S_8$, in the presence of the vulcanization accelerator comprising the metal-organic framework, wherein the metal-organic framework comprises Zn(1,4-Benzenedicarboxylate), $Zn_4O$ (4,4',4"-[benzene-1,3,5-triyl-tris(ethyne-2,1-diyl)]tribenzoate) (biphenyl-4,4'-dicarboxylate), $Zn_4O$ (4,4',4"-[benzene-1,3,5-triyl-tris(benzene-4,1-diyl)]tribenzoate), or a mixture thereof.

11. The method according to claim 10, wherein the vulcanization is conducted at a temperature range of 70 to 90° C.

12. The method according to claim 10, wherein the vulcanization is conducted for 1 to 60 minutes.

13. The method according to claim 10, wherein the vulcanization is conducted while the anode binder material is coated on an anode current collector.

14. The method according to claim 10, wherein before the vulcanization, the method further comprises steps of:

preparing an anode active material slurry comprising an anode active material, the anode binder material, a conductive agent, and a solvent; and coating the anode active material slurry on one side or both sides of an anode current collector.

15. The method according to claim 14, wherein in 100 wt % of the anode active material slurry, a content of the anode binder material is 0.1 to 0.5 wt %.

16. An anode for a lithium rechargeable battery comprising an anode current collector; and an anode active material layer positioned on the anode current collector, and comprising the anode binder composition according to claim 8, an anode active material, and a conductive agent.

17. A lithium rechargeable battery comprising the anode of claim 16;

an electrolyte; and a cathode.

* * * * *